(12) United States Patent
Suda

(10) Patent No.: US 7,449,083 B2
(45) Date of Patent: Nov. 11, 2008

(54) METHOD OF FORMING CORD-REINFORCED TIRE STRUCTURAL MEMBER

(75) Inventor: Nobuyuki Suda, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 394 days.

(21) Appl. No.: 10/535,846

(22) PCT Filed: Nov. 21, 2003

(86) PCT No.: PCT/JP03/14880

§ 371 (c)(1),
(2), (4) Date: Oct. 11, 2005

(87) PCT Pub. No.: WO2004/045840

PCT Pub. Date: Jun. 3, 2004

(65) Prior Publication Data

US 2006/0124227 A1 Jun. 15, 2006

(30) Foreign Application Priority Data

Nov. 21, 2003 (JP) ............................. 2002-337787

(51) Int. Cl.
*B29D 30/38* (2006.01)
(52) U.S. Cl. .................. 156/264; 156/117; 156/134; 156/906
(58) Field of Classification Search ............... 156/117, 156/397, 134, 405.1, 406.4, 906, 907, 264–266
See application file for complete search history.

(56) References Cited

U.S. PATENT DOCUMENTS

| 5,328,532 A | 7/1994 | Azuma et al. |
| 2003/0051794 A1 * | 3/2003 | Suda et al. ................. 156/123 |

FOREIGN PATENT DOCUMENTS

| EP | 0 478 259 A2 | 4/1992 |
| EP | 0 492 918 A2 | 7/1992 |
| EP | 0 619 170 A2 | 10/1994 |
| EP | 0 958 913 A1 | 11/1999 |
| EP | 1 145 835 A2 | 10/2001 |
| JP | 59-39538 A | 3/1984 |
| JP | 2000-159399 A | 6/2000 |
| JP | 2000-229503 A | 8/2000 |
| JP | 2001-322186 A | 11/2001 |
| WO | WO-02/055289 A1 * | 7/2002 |

OTHER PUBLICATIONS

*Patent Abstracts of Japan*, vol. 004, No. 136 (M-033) (Sep. 24, 1980) as it relates to JP 55 091649 A, issued Jul. 11, 1980 and assigned to Yokohama Rubber Co., Ltd.

* cited by examiner

*Primary Examiner*—Geoffrey L Knable
(74) *Attorney, Agent, or Firm*—Sughrue Mion, PLLC

(57) ABSTRACT

A cord-reinforced tire structural member is formed by successively arranging strips of a predetermined width w of about π in. and bonding together edge parts of adjacent strips 3. The number of cords included in each of the strips 3 is determined for the type of the cords. A tire structural member 4 is formed by successively arranging a number of the strips 3, equal to a tire size in inch in a direction parallel to the width of the strips and bonding together edge parts of adjacent strips 3. Thus, the number of cords to be included in the tire structural member 4 for one tire can be easily fixed.

4 Claims, 4 Drawing Sheets

US 7,449,083 B2

METHOD OF FORMING CORD-REINFORCED TIRE STRUCTURAL MEMBER

FIELD OF THE INVENTION

The present invention relates to a method of forming a cord-reinforced tire structural member.

BACKGROUND ART

A prior art method of forming a cord-reinforced tire structural member, such as a ply or a belt, disclosed in, for example, JP 2000-159399 A includes a coating process of coating cords with a rubber compound to form a cord-reinforced rubber belt, a cutting process of cutting the cord-reinforced rubber belt into strips of a length corresponding to the length of a section of a tire, and a tire structural member sheet forming process of successively arranging the strips such that the side edges of adjacent strips overlap each other to form a ply sheet or a belt sheet. The ply or belt sheet is wound in a large roll for storage. The large roll of the ply sheet or belt sheet is then sent to a ply or belt forming process. The ply or belt forming process cuts the ply sheet or belt sheet into plies or belts of a predetermined length conforming to the size of the tire.

The cords of the ply sheet wound in the large roll are arranged in the ply sheet so as to extend in a direction parallel to the axis of the tire. Since the cords are arranged at very small pitches slightly smaller than 1 mm, the pitches of the cords are liable to include errors. The ply sheet is cut into plies of a predetermined length corresponding to the circumference of the tire. Since errors in the pitches of the cords are accumulated in each of the plies, it is difficult to form the plies having the same number of the cords.

The pitches of the cords in the cord-reinforced rubber belt are determined by the coating step. There is a tendency that the cords are arranged in a higher density in edge parts of the cord-reinforced rubber belt. Consequently, the pitches of the cords are distributed irregularly in the plies.

The width of the cord-reinforced rubber belt is affected by variation of the line speed and rubber curing degree when operating conditions for the coating process are changed.

Thus, errors in the pitch of the cords of the ply sheet wound in the large roll tend to increase and hence it is very difficult to form the plies of the same length having the same number of cords.

The weight of the tire increases and material cost increases if the number of the cords in the plies is excessively large. The dynamic balance and the uniformity of the tire are deteriorated if the number of the cords deviates greatly from a predetermined number.

The present invention has been made in view of such problems and it is therefore an object of the present invention to provide a method of forming a cord-reinforced tire structural member, capable of easily forming a cord-reinforced tire structural member that is reinforced by a predetermined number of cords.

DISCLOSURE OF THE INVENTION

The present invention provides a method of forming a cord-reinforced tire structural member, including the steps of: forming strips of a predetermined width reinforced by a predetermined number of cords of a type, and forming a tire structural member by successively arranging a predetermined number of the strips, which is specified for a tire size of the strips and joining together side edge parts of the adjacent strips.

Thus, the tire structural member is formed by successively arranging a predetermined number, which corresponds to a tire size, of the strips and joining together side edge parts of the strips. Therefore, the tire structural member thus formed by the simple method is provided with the number of the cords accurately corresponding to a number specified for a tire size. Since the number of the cords in the tire structural member is accurately fixed, the weight and the cost of the tire do not increase, and the dynamic balance and the uniformity of the tire can be improved.

In the cord-reinforced tire structural member forming method according to the present invention, the strips may be formed in a width of about $\pi$ inches, and a tire structural member for a tire of a size of n in. (n is an integer) may be formed by successively connecting the n strips.

When the tire has a size of n in., the n strips of $\pi$ in. in width are connected successively to form the tire structural member for the tire. Thus, the strips of about $\pi$ in. in width facilitate manufacturing the tire. A tire structural member forming apparatus for manufacturing the tire structural member is simplified and can be formed in a small size to manufacture the tire structural member at low manufacturing cost.

In the method of forming a cord-reinforced tire structural member according to the present invention, desired numbers of cords respectively of tire structural members of tires respectively having tire sizes in inches may be specified, the desired numbers of cords may be divided by the tire sizes, respectively, to obtain quotients, the mean of the quotients may be calculated, and the integral part of the mean of the quotients may be the number of cords included in the strips.

The number of the cords included in the strips is thus determined on the basis of the desired number of the cords for each tire size. Therefore, the number of the cords included in the tire structural member formed by connecting the strips equal to or substantially equal to the desired number.

The number of cords in the tire structural member for one tire may be determined for each type of cords and the number of cords included in each strip may be determined for each type of cords.

Thus, the number of cords included in the tire structural member most suitable for the type of cords can be determined.

Practically, it is preferable that the number of cords in each strip is equal to the calculated number minus one, and adjacent strips are bonded together with one of the outermost cords respectively in the corresponding edge parts of the adjacent strips overlapping the other outermost cord. Preferably, side edge parts to be superposed of the strips are tapered toward the edges of the strips.

BEST MODE FOR CARRYING OUT THE INVENTION

A method of forming a cord-reinforced tire structural member in a preferred embodiment of the present invention will be described with reference to FIGS. 1 to 6.

Figure 1:
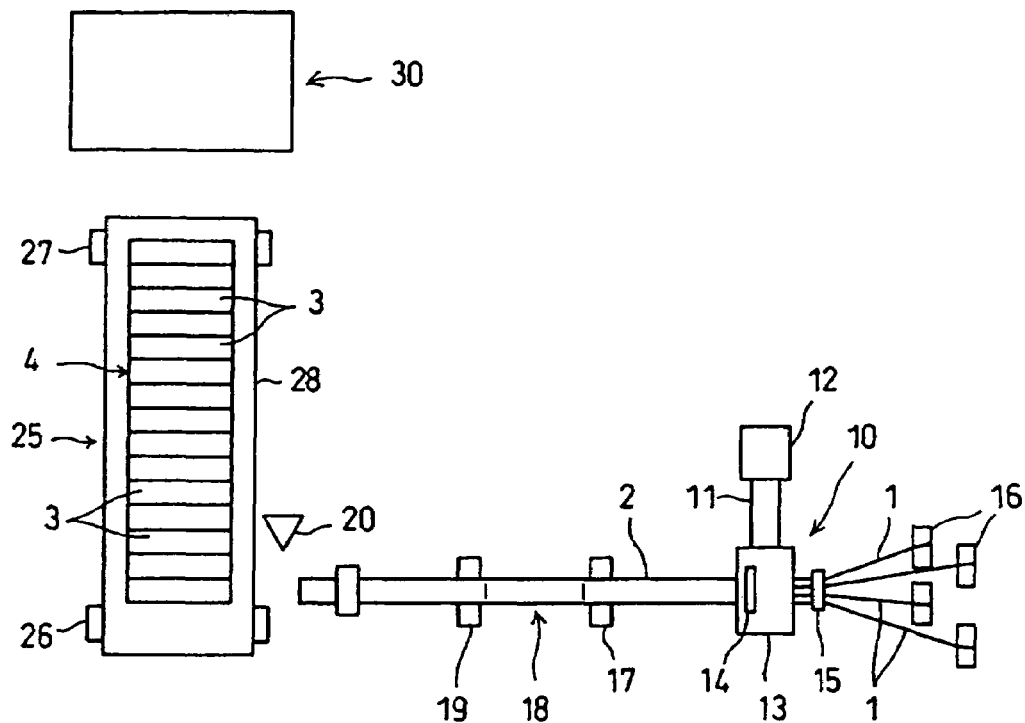
FIG. 1 is a schematic plan view of a ply manufacturing system suitable for carrying out a cord-reinforced tire structural member forming method in a preferred embodiment of the present invention.
Figure 2:
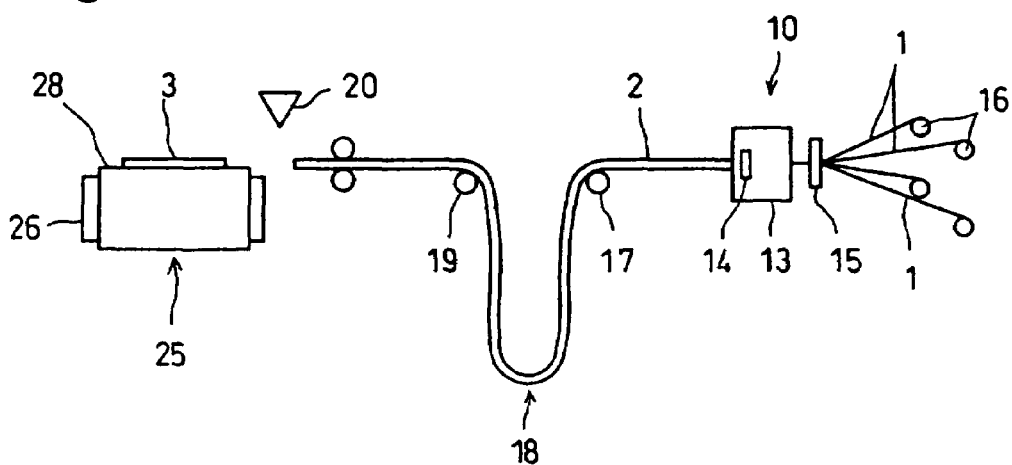
FIG. 2 is a schematic side elevation of the ply manufacturing system shown in FIG. 1.
Figure 3:
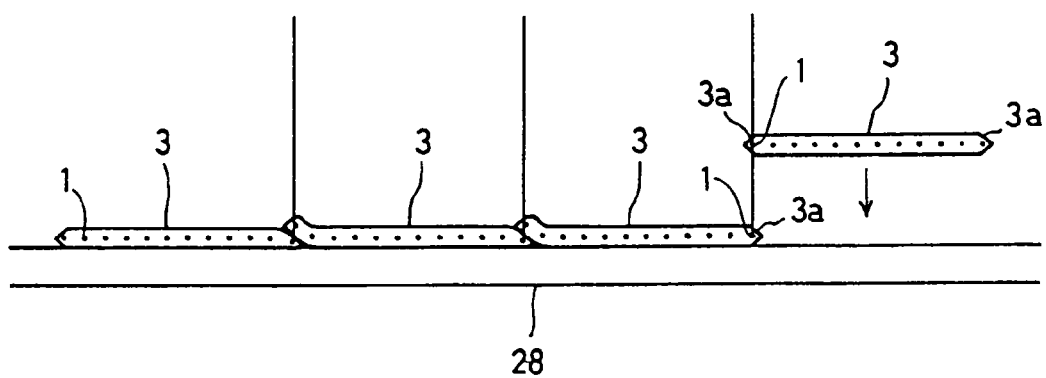
FIG. 3 is schematic view showing a ply forming process that successively bonds strips together.

Actually the method of forming a cord-reinforces tire structural member in this embodiment is a ply forming method of forming a ply, namely, a tire structural member. FIGS. 1 to 3 show a ply manufacturing system for carrying out the ply forming method.

An extruder 10 for extruding a rubber compound has a cylinder 11 internally provided with a screw, not shown, and a hopper 12 connected to the cylinder 11 to feed a material, namely, a rubber compound, into the cylinder 11. The screw is rotated to knead the rubber compound fed into the cylinder 11 and to carry the rubber compound through the front end of the cylinder 11 to a die 14 of a predetermined shape held in an insulation head 13.

An inserter 15 is disposed behind the die 14 of the insulation head 13 of the extruder 10. A plurality of cords 1, such as steel cords or resin cords, unwound from a plurality of reels 16 disposed behind the inserter 15 are arranged parallel to each other in a horizontal plane. The parallel cords 1 travel through the die 14 as the rubber compound is extruded through the die 14 to coat the cords 1 with the rubber compound. Thus, a cord-reinforced belt 2 of a predetermined shape is formed continuously.

The cord-reinforced belt 2 of a predetermined width continuously extruded by the extruder 14 is wound round a pull drum 17. The pull drum 17 pulls the cord-reinforced belt 2. The cord-reinforced belt 2 is delivered through an idle roller 19 onto a belt conveyor 25. A festoon 18 is formed between the pull roller 17 and the idle roller 19.

A cutter 20 is disposed in front of the belt conveyor 25. The belt conveyor 25 has rollers 26 and 27, and a conveyor belt 28 extends between the rollers 26 and 27. The cutter 20 cuts the cord-reinforced belt 2 into strips 3 of a predetermined length. The strips 3 are delivered successively onto the conveyor belt 28 in a direction perpendicular to a conveying direction in which the conveyor belt 28 conveys the strips 3.

The strip 3 is delivered onto the conveyor belt 28, the conveyor 25 is driven to advance the strip 3 by a predetermined distance, and then the next strip 3 is delivered onto the conveyor belt 28 so that a front side edge part of the succeeding strip 3 overlap a back side edge part of the preceding strip 3 such that the cord 1 in the front side edge part of the succeeding strip 3 overlaps the cord 1 in the back side edge part of the preceding strip 3 as shown in FIG. 3. The superposed side edge parts of the adjacent strips 3 are bonded together. Thus, a ply 4, namely, a tire structural member, is formed. Shown also in FIG. 1 is a ply forming drum 30 for forming the ply 4.

Tire sizes in inches of tires are represented by rim bead seat design diameters, respectively. For example, there are tires respectively having beads of 15 inches, 16 inches, 17 inches and such in inside diameter. The respective lengths of the plies of tires of those tire sizes are about 15π inches, 16π inches, 17π inches and such.

When the strip 3 has a width equal to π inches corresponding to the circumference of a circle of 1 inch diameter, plies respectively for 15 in., 16 in. and 17 in. tires can be formed by successively arranging fifteen strips 3, sixteen strips 3 and seventeen strips 3 in the direction of the width of the strips 3 and bonding together adjacent strips 3, respectively. Thus, plies for tires having different tire sizes can be formed by using the strips 3 of the same size only.

It is convenient to form plies for tires of different tire sizes by successively connecting integral numbers of strips 3 of the same size corresponding to tire sizes, respectively. Consequently, the ply manufacturing system can be simplified and the manufacturing cost of plies can be reduced.

The cord-reinforced tire structural member forming method in this embodiment forms the ply 4 by successively arranging the strips 3 of π inches in width so that the corresponding side edge parts of adjacent strips 3 are superposed such that the cords 1 in the superposed side edge parts of the adjacent strips 3 overlap each other.

Figure 4:
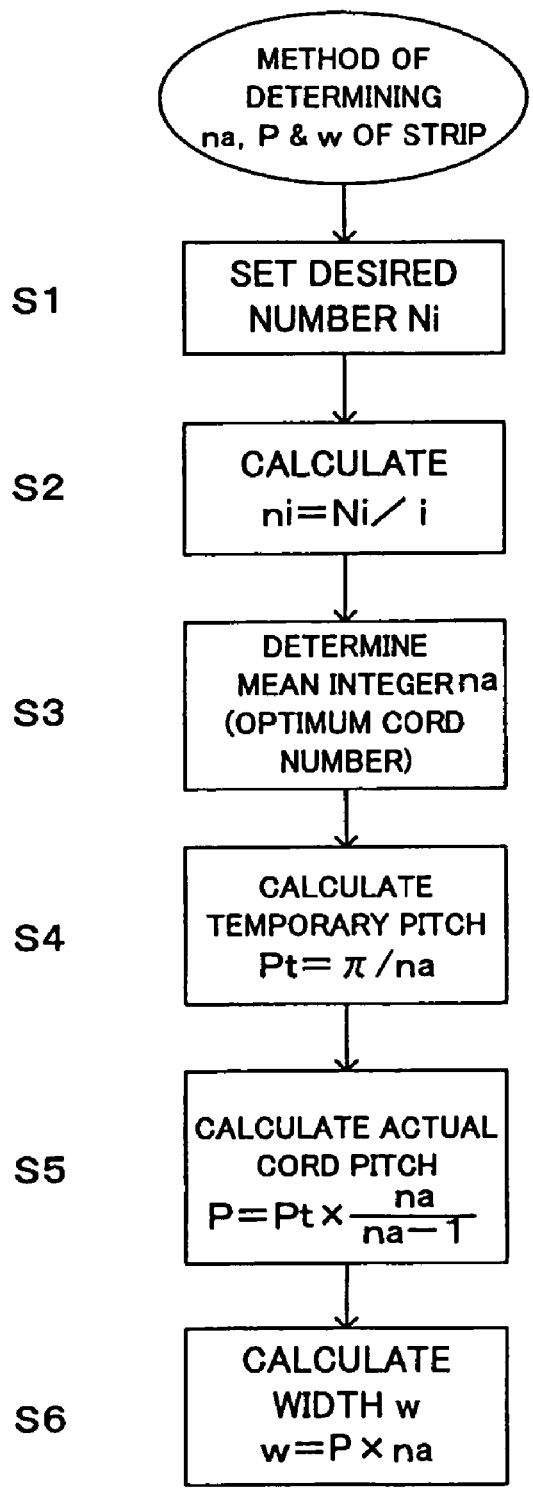
FIG. 4 is a flow chart of a procedure for determining the number of cords included in a strip and determining the width of the strip.

A method of determining the number $n_a$ of the cords 1 in the strip 3 (the cord-reinforced belt 2), the pitches P of the cords and the width w of the strip 3 (the cord-reinforced belt 2) will be described with reference to a flow chart shown in FIG. 4.

A desired number $N_i$ of the cords 1 for a ply of a tire of a tire size of i in. is set in step S1. More specifically, the desired numbers $N_i$ are $N_{15}$, $N_{16}$, . . . for plies for a 15 in. tire, a 16 in. tire, . . . , respectively. An optimum desired number is dependent on the type of the cords, such as steel cords and resin cords, and hence the desired numbers $N_i$ are set depending on types of cords, respectively.

In the following description, it is supposed that the type of cords is fixed.

The desired number $N_i$ for the tire size i in. is divided by i corresponding to the tire size of i in. to obtain a quotient $n_i$ in step S2. For example, for tire sizes of 15 in. and 16 in., $n_{15}=N_{15}/15$ and $n_{16}=N_{16}/16$.

The values of $n_i=N_i/i$ for different tire sizes are not necessarily integers and are dispersed. An integer $n_a$ nearest to the mean of the values of $n_i$ is determined in step S3.

If plots of $n_i$ values are made in a distribution chart, in which tire size is taken on the horizontal axis and $n_i$ is taken on the vertical axis, the plots of the $n_i$ values in the chart are near a certain integer, and hence the integer $n_a$ can be determined easily. The integer $n_a$ is equal to an optimum number of cords to be included in the strip 3.

The value of the integer $n_a$, namely, optimum number of cords is determined for different types of cords, respectively. For example, the optimum number $n_a$ of cords of a synthetic resin was eighty-eight.

Figure 5:
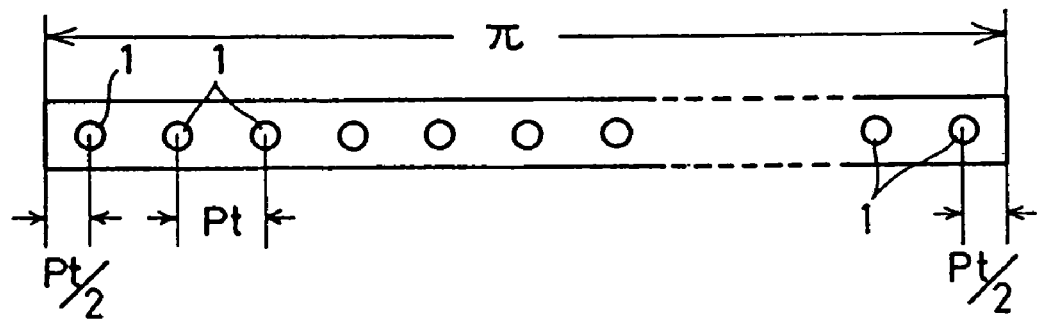
FIG. 5 is a schematic end view of a strip of π inches in width.

When the optimum number $n_a$ of cords are arranged evenly in a strip 3 of π inches in width as shown in FIG. 5, a temporary pitch $P_t$ is calculated by using: $P_t=\pi/n_a$ in step S4. The distance between the outermost cord and the side edge of the strip 3 is $P_t/2$.

Figure 6:
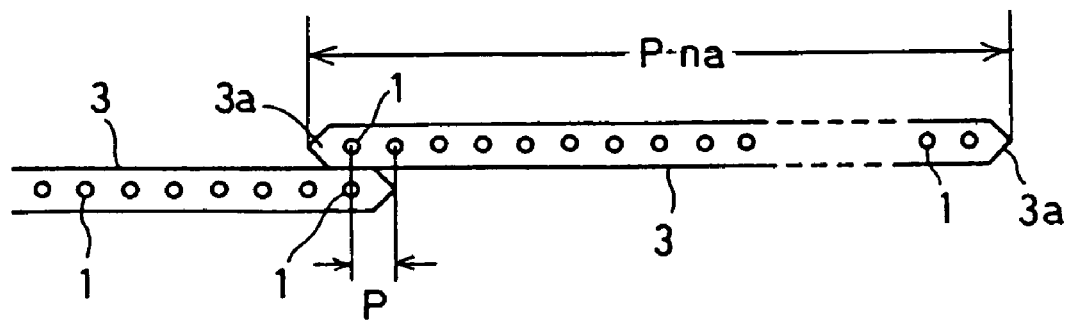
FIG. 6 is an enlarged sectional view of adjacent strips, explaining the positional relation between adjacent strips.

Practically, the pitch of the cords is changed so that $(n_a-1)$ cords are arranged in a width of π inches because the corresponding side edge parts of adjacent strips 3 are superposed such that the outermost cords of the corresponding side edge parts overlap each other as shown in FIG. 6. The pitch P is obtained by multiplying the temporary pitch $P_t$ by $n_a/(n_a-1)$ in step S5.

$$P = P_t \times \{n_a/(n_a-1)\}$$
$$= (\pi \cdot n_a) \times \{n_a/(n_a-1)\}$$
$$= \pi/(n_a-1)$$

When the optimum number n of cords is eighty-six for example, $P=\pi/(n_a-1)=\pi.85$ in.$=0.94$ mm.

The width w of the strips 3 is calculated by multiplying the pitch P by $n_a$ in step S6.

$w=P \times n_a=\pi\{n_a/(n_a-1)\}$

Thus, the width w of the strips 3 is determined.

When the optimum number n of cords is eighty-six for example, the width w of the strips 3 is:

$\pi \times (86/85)=1.01$ in.$=80.7$ mm.

The side edge parts 3a of the strip 3 are formed in a sectional shape resembling an isosceles triangle as shown in FIGS. 3 and 6 so that the joint of the corresponding side edge parts of adjacent strips 3 may not be excessively thick.

The extruder 10 forms the cord-reinforced belt 2 of the width w including the $n_a$ cords 1 arranged at the pitch P.

When the foregoing type of cords is used, eighty-six cords are arranged at a pitch of 0.94 mm in a cord-reinforced belt 2 of 80.7 mm in width.

The ply for a tire of a tire size includes an accurately fixed number of cords. For example, the respective numbers of cords included in plies respectively for tires of tire sizes of 15 in. and 16 in. are $15n_a$ and $16n_a$, respectively.

Thus, the tire structural member for one tire of a tire size includes an accurately fixed number of cords. Therefore, increase in the weight and the cost of the tire can be prevented, and the dynamic balance and uniformity of the tire can be improved.

The invention claimed is:

1. A method of forming a cord reinforced tire structural member, comprising:

forming strips having a width of approximately $\pi$ inches and reinforced by cords embedded therein;

successively arranging a predetermined number of the strips in side-by-side adjacent disposition; and joining together side edge parts of the strips to form a cord-reinforced tire structural member;

setting a desired number of the cords to be included in the cord-reinforced tire structural member for each of tire sizes in units of inches;

dividing the desired number of the cords by each of the tire sizes to calculate a quotient for each tire size, thus obtaining quotients for respective tire sizes;

calculating a mean value of the thus obtained quotients; and determining an integral part of the mean value to be the number of the cords to be included in each of the strips.

2. The method of forming a cord reinforced tire structural member as claimed in claim 1, wherein the number of cords in the tire structural member for one tire is determined for a given type of cords and the number of cords included in each strip is determined for a given type of cords.

3. The method of forming a cord reinforced tire structural member as claimed in claim 1, wherein the number of cords included in the strip is equal to the desired number of cords minus one, and corresponding side edge parts of adjacent strips are bonded together such that the outermost cords in the corresponding side edge parts of the adjacent strips overlap each other.

4. The method of forming a cord reinforced tire structural member as claimed in claim 3, wherein side edge parts of each strip are tapered toward the edges of the strip.

* * * * *